(12) United States Patent
Someya

(10) Patent No.: US 8,352,076 B2
(45) Date of Patent: Jan. 8, 2013

(54) ROBOT WITH CAMERA

(75) Inventor: Yuichi Someya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 12/786,554

(22) Filed: May 25, 2010

(65) Prior Publication Data

US 2010/0312393 A1    Dec. 9, 2010

(30) Foreign Application Priority Data

Jun. 3, 2009   (JP) .................................. 2009-133764

(51) Int. Cl.
*G05B 15/00* (2006.01)

(52) U.S. Cl. ............ 700/259; 700/245; 700/250; 901/2; 901/15; 901/47

(58) Field of Classification Search ................... 700/259; 901/2, 15, 47
See application file for complete search history.

(56) References Cited

U.S. PATENT DOCUMENTS

| | | | |
|---|---|---|---|
| 5,150,150 A * | 9/1992 | Enomoto | 396/53 |
| 5,708,863 A * | 1/1998 | Satoh et al. | 396/52 |
| 7,313,464 B1 * | 12/2007 | Perreault et al. | 700/245 |
| 7,975,284 B2 * | 7/2011 | Takano et al. | 725/105 |

FOREIGN PATENT DOCUMENTS

| | | |
|---|---|---|
| JP | 2603871 B | 4/1997 |
| JP | 2001-252883 A | 9/2001 |

* cited by examiner

*Primary Examiner* — Mary Cheung
*Assistant Examiner* — Jerrah Edwards
(74) *Attorney, Agent, or Firm* — Fitzpatrick, Cella, Harper & Scinto

(57) ABSTRACT

A robot with a camera includes a hand with a finger, a camera disposed on the hand, a robot arm including the hand, and a control portion which searches for a work based on an image obtained by the camera and controls the robot arm. In addition, a unit detects a velocity of the camera, and a unit detects a position of the camera relative to a predicted stopping position of the camera. The control portion permits the camera to take the image used for searching for the work, when the velocity of the camera takes a preset velocity threshold value or lower and the position of the camera relative to the predicted stopping position takes a preset position threshold value or lower.

4 Claims, 7 Drawing Sheets

ROBOT WITH CAMERA

BACKGROUND OF THE INVENTION

1. Field of the Invention

The present invention relates to a robot with a camera, which has a camera for confirming a work as an object to be assembled.

2. Description of the Related Art

In general, image sensing conditions of a camera necessary for image processing include that there is no blur due to a vibration and that there is reproducibility of a position of a subject on the taken image, i.e., that a relative position between camera coordinates and coordinates at which the subject exists is grasped.

If a shutter speed is simply increased as a countermeasure against vibration, there is a problem of a decrease in imaging sensitivity due to insufficient light amount. In particular, the problem becomes conspicuous when an aperture stop of a lens is decreased for increasing a depth of field (range in the depth direction in which focus is obtained).

For instance, as a countermeasure against vibration when a camera is mounted on a robot arm, which is common in an FA field of automatic assembling recent years, there is known a method of releasing a shutter after vibration settling prospective time has passed (see Japanese Patent Application Laid-Open No. 2001-252883).

As a general countermeasure against vibration of a camera itself, there is known a technology of calculating an angular velocity from the integral of an angular acceleration sensor in the XY plane (e.g., an inertial force to a gyroscope), and enabling shutter operation if the calculated value is a threshold value or smaller (see Japanese Patent No. 2603871). It is supposed that the angular velocity is represented by W, and a rotation radius from the center of vibration to an arbitrary point F is represented by R. Then, a velocity of the point F is expressed as V=RW.

If a camera is mounted on an assembly robot, the following problem may occur. Hereinafter, for deeper understanding of the present invention, a related technology of the present invention is described with reference to the attached drawings. For instance, FIG. 7A illustrates an arm of a 7-axis vertical articulated robot (robot arm) including a J7 axis 107 for turning a wrist, a J6 axis 108 for a lower arm, and J1 to J5 axes (not shown). A hand 106 is mounted on the tip of the J7 axis 107, and a camera 101 is mounted via a camera supporter 102 on the hand 106 at its base portion. A tip portion of the hand 106 is constituted of fingers 104 for grasping a work 112. Assembling of the work 112 is performed using an image processing portion 109 for processing images of the camera 101 and a program for assembling written in a control portion 110 of the robot.

The camera 101 searches for the work 112 by an image processing method such as pattern matching, and a result thereof is used for the fingers 104 to grasp the work 112. A point F to be a reference in camera coordinates (Xc, Yc, Zc) is provided on the finger 104, and a position of the point F is recognized by the image processing method such as the pattern matching in the broken line illustrated in FIG. 7B.

It is supposed that the hand 106 is moved by a "trapezoidal" velocity instruction Vcm between start point Ps and end point Pe as illustrated in FIG. 6 in the order of stop, acceleration move, constant rate of move, deceleration move, and stop in the robot with a camera. Then, mainly because of an influence of mechanical elasticity of the 7-axis mechanism, the hand 106 is vibrated, resulting in an overshoot at the end of the acceleration and an undershoot at the end of the deceleration.

If the vibration of the undershoot remains, relative positions of the point F and the work vary so that it is difficult to perform precise image processing. For easy understanding of description, it is supposed that the start point Ps and the end point Pe are on the X axis of the robot coordinates (X, Y, Z, Xm, Ym, Zm).

FIG. 5 is a graph illustrating a relationship between undershoot and shutter chance. As a countermeasure against vibration due to the undershoot, it is conceivable to wait until the vibration of the robot is settled sufficiently without permitting release of the shutter, and to release the shutter based on a detection signal after detecting that the vibration has been settled sufficiently. In other words, the shutter can be released after "waiting" vibration settling prospective time WT for a real position Pn from a start point at end time to of a positional instruction Pcm illustrated in FIG. 5. However, an adverse effect may be caused in industrial production, which includes an increase in assembly tact time. The vibration settling prospective time WT may be approximately one second, and float time WTs from the start point at time t7 when the vibration is actually settled is included in many cases. In this way, because of waiting for vibration settling, there is wasted time before releasing the shutter.

A time slot after passing of the vibration settling prospective time WT is indicated by a black band in the line of "6 PASSING OF TIMER WT" in the upper part of FIG. 5. The shutter is released at time t8 indicated by a small circle at the head of the black band.

The vibration settling prospective time WT varies in accordance with a movement stroke of the arm. Therefore, in a pick and place application in matrix, the stroke varies every time. For that reason, it is necessary to anticipate the float time WTs for vibration settling corresponding to a maximum vibration, which may cause more wasted time.

As a countermeasure against vibration of a camera itself, it is conceivable to release the shutter when the angular velocity is low, so as to suppress the vibration. In this case, a position of a specific point of the subject in the taken image is not secured. Therefore, this method cannot be applied to an assembly robot as it is.

SUMMARY OF THE INVENTION

The present invention provides a robot with a camera, which enables releasing a shutter of the camera for searching for a work as fast as possible within a range satisfying accuracy required for image processing.

The present invention provides a robot with a camera including: a hand with a finger; a camera disposed on the hand; a robot arm including the hand; a control portion which searches for a work based on an image obtained by the camera and controls the robot arm; a unit which detects a velocity of the camera; and a unit which detects a position of the camera, in which the control portion permits the camera to take the image used for searching for the work, when the velocity of the camera takes a preset velocity threshold value or lower and the position of the camera takes a preset position threshold value or lower.

The shutter is released at a moment when it is determined that the vibration has been settled within a minimum range corresponding to accuracy required for assembly. Therefore, blur of the image for searching for the work can be reduced. Further, wasted time can be suppressed by releasing the shutter as fast as possible, to thereby improve efficiency of assembly.

Further features of the present invention will become apparent from the following description of exemplary embodiments with reference to the attached drawings.

DESCRIPTION OF THE EMBODIMENTS

<Embodiment 1>

Figure 1:
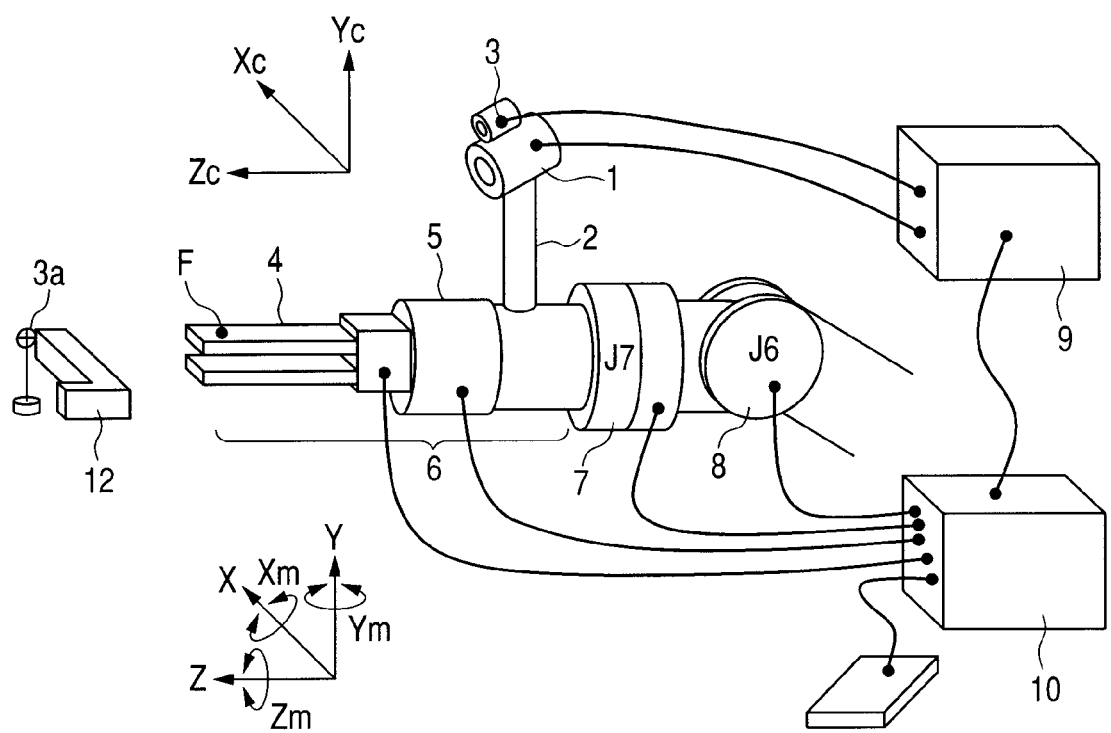
FIG. 1 is a perspective view illustrating a structure of a robot with a camera according to Embodiment 1.

FIG. 1 illustrates a robot with camera according to Embodiment 1, which uses a robot arm including a J7 axis 7 for turning a wrist, a J6 axis 8 for a lower arm, and J1 to J5 axes (not shown). A hand 6 constituted of a bracket and fingers 4 is mounted on the tip of the J7 axis 7, and a camera 1 is mounted on a base portion of the hand 6 via a camera supporter 2. A velocity sensor 3 that is a unit for detecting velocity is mounted on the camera 1. Velocity information of the velocity sensor 3 is obtained by a control portion 10 via an image processing portion 9. A tip portion of the hand 6 is constituted of the fingers 4 for grasping a work 12. Assembling of the work 12 is performed using the image processing portion 9 for processing images obtained by the camera 1 and a program for assembling written in the control portion 10 of the robot.

A position of the work 12 is searched for by an image processing method such as pattern matching from the image taken by the camera 1, and the work 12 is grasped by the fingers 4. A point F to be a reference in the camera coordinates (Xc, Yc, Zc) is provided on the finger 4. The velocity sensor 3 detects acceleration and determines the velocity from the integral of the acceleration.

An alignment mark 3a to be a positional reference for detecting a camera position is disposed on the same pedestal having the robot arm. Thus, a position of the camera 1 can be detected from the image by the camera 1. If the robot coordinates of the alignment mark 3a are known, robot coordinates of the camera 1 can be obtained.

Figure 2A:
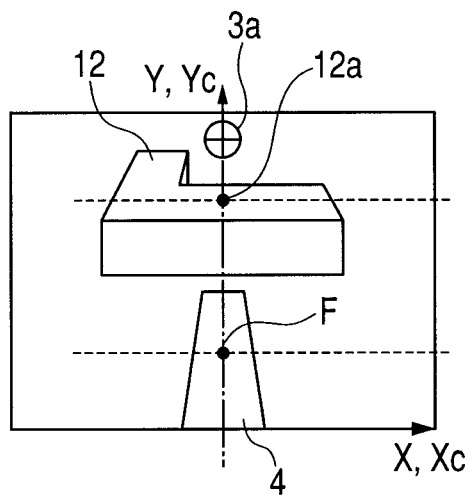
FIGS. 2A, 2B and 2C illustrate taken images according to Embodiment 1.
Figure 2B:
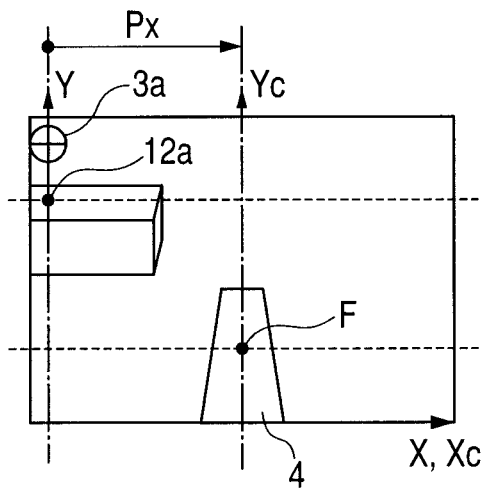
Figure 2C:
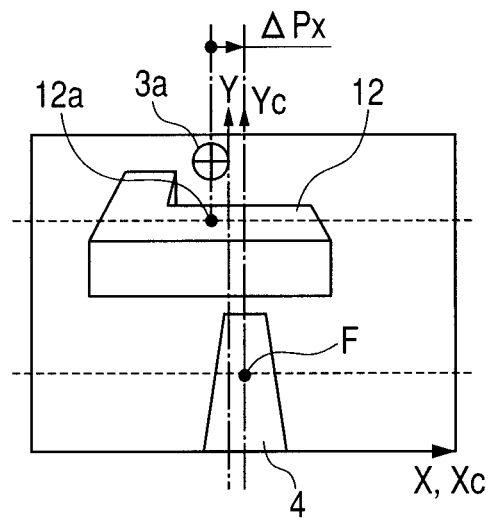

FIGS. 2A to 2C illustrate examples of images taken by the camera 1, in which X and Y of the lower end line indicate robot coordinates, and Xc and Yc of the middle line indicate camera coordinates. FIG. 2A illustrates an image after the hand 6 is driven and stopped completely, e.g., an image obtained by releasing the shutter at time t8 illustrated in FIG. 5 for searching for the work 12, from the control portion 10 via the image processing portion 9. The hand is completely stopped, and hence a position coordinate deviation Px in a camera X coordinate between the alignment mark 3a and the point F is zero. The position coordinate deviation Px can be calculated by a simple operation from the image obtained by the camera 1.

FIG. 2B illustrates an image obtained by releasing the shutter at time t0 when a real velocity Vn becomes zero first. At this time point, undershoot of a real position Pn is so large that the position of the camera 1 is shifted to the right in the X coordinate. Therefore, the position coordinate deviation Px between the alignment mark 3a and the point F is increased, which should be zero intrinsically.

Figure 5:
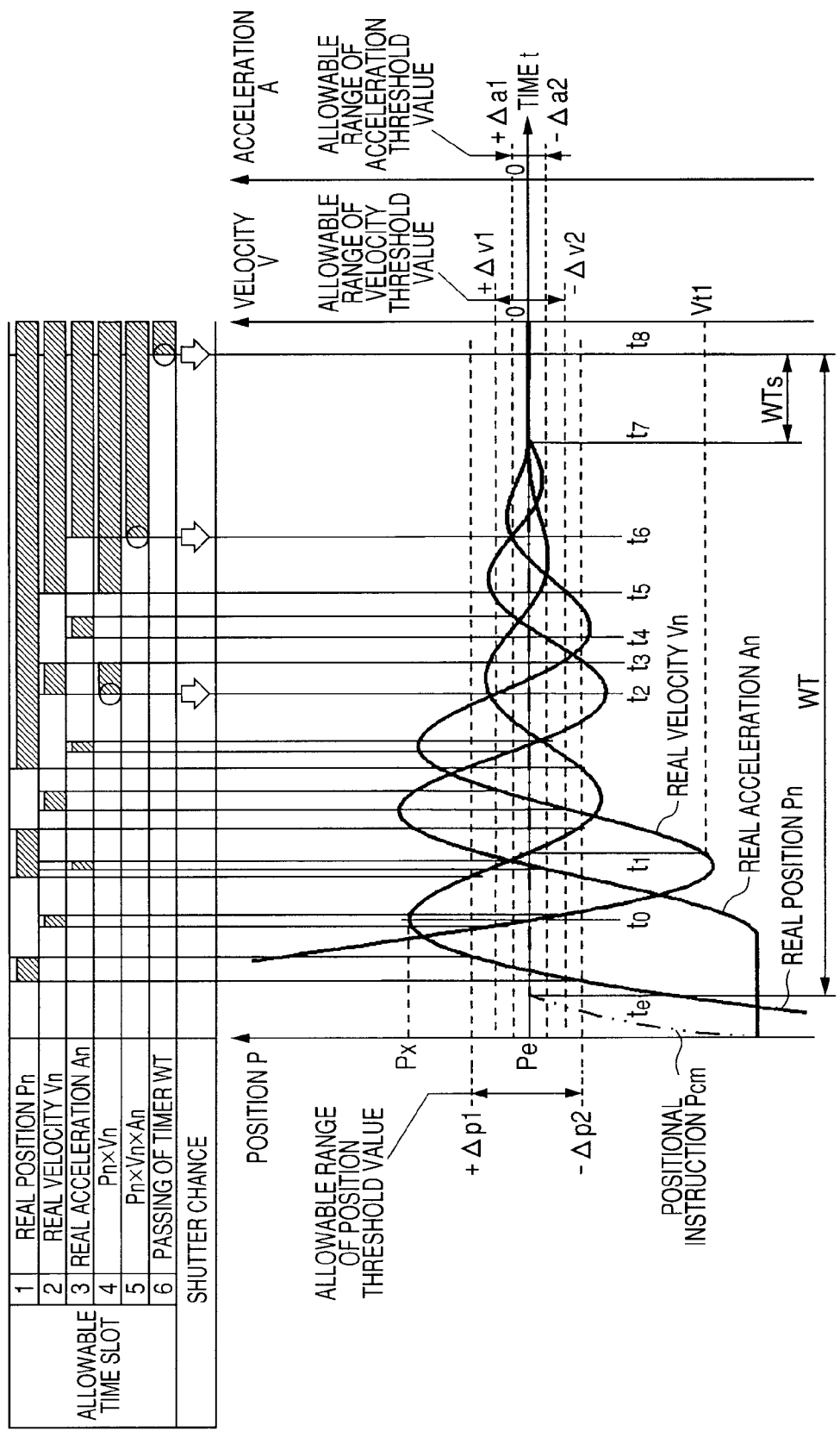
FIG. 5 is a graph illustrating a relationship between an undershoot and a shutter chance.

FIG. 2C illustrates an image obtained by releasing the shutter after the undershoot of the real position Pn has become small, e.g., an image at time t4 illustrated in FIG. 5. The distance between the alignment mark 3a and the point F is determined from the image obtained by the camera 1 as an error of ΔPx that is a value smaller than that in FIG. 2B.

If the shutter is released in the state where the undershoot is small, a measurement error becomes small. For instance, a state with a small undershoot is supposed to fall within the range between $+\Delta p1$ and $-\Delta p2$ on the axis of the real position Pn illustrated in FIG. 5, which are defined as position threshold values.

Specific values of the position threshold values $\Delta p1$ and $\Delta p2$ depend on accuracy required for the image processing system. The required accuracy is approximately 0.1 to 1 mm in the FA field of automatic assembling though it is on a case by case basis, and the user can determine any value that is approximately a fraction thereof. For instance, it is determined that required accuracy Rp for the image processing system is 0.5 mm, and a threshold value coefficient Kp of the real position Pn indicating a ratio of allowable measurement error to Rp is 5. Then, the position threshold values $\Delta p1$ and $\Delta p2$ are 0.1 mm each from Expression (1).

$$\Delta p1 = \Delta p2 = Rp/kp = (0.5 \text{ mm}/5) = 0.1 \text{ mm} \qquad (1)$$

If the required accuracy is not high, $\Delta p1$ and $\Delta p2$ can take large values so that the shutter can be released at earlier timing. It is not necessary that $\Delta p1$ and $\Delta p2$ have the same value.

Even if the undershoot is small at a certain moment, when the velocity of the camera 1 at the moment is large, the image may be blurred unless the camera 1 uses a proper high speed shutter. For instance, at time t1 of FIG. 5, the real position Pn has reached an end point Pe. A velocity Vt1 at this time point is high speed, and hence the blur will occur with very high probability. Therefore, as a condition for releasing the shutter, the upper limit of the allowable velocity is set in the range between $+\Delta v1$ and $-\Delta v2$ on the velocity V axis illustrated in FIG. 5, which are defined as velocity threshold values.

Specific values of the velocity threshold values $\Delta v1$ and $\Delta v2$ depend on accuracy required for the image processing system, in the same manner as the position threshold values $\Delta p1$ and $\Delta p2$ described above. For instance, a shutter speed Ss (i.e., shutter release time) is set to $1/100$ seconds (i.e., 0.01 s), the required accuracy Rp is set to 0.5 mm as described above, and a threshold value coefficient Kv of the real velocity Vn indicating a ratio of allowable measurement error to Rp is set to 5. Then, the velocity threshold values $\Delta v1$ and $\Delta v2$ for setting the upper limit of the velocity of the camera 1 are 10 mm/s each from Expression (2).

$$\Delta v1 = \Delta v2 = (Rp/Kv)/Ss = (0.5 \text{ mm}/5)/0.01 \text{ s} = 10 \text{ mm/s} \qquad (2)$$

If the required accuracy is not high, $\Delta v1$ and $\Delta v2$ can take large values so that the shutter can be released at earlier timing. It is not necessary that $\Delta v1$ and $\Delta v2$ have the same value. In the upper part of FIG. 5, time slots below the position threshold value are indicated by black bands in the line of "1 REAL POSITION Pn", and time slots below the velocity threshold value are indicated by black bands in the line of "2 REAL VELOCITY Vn". The time slot satisfying both is "4 Pn×Vn".

From the above-mentioned result, the time slot below the position threshold value and below the velocity threshold value corresponds to the timing for releasing the shutter, i.e., the shutter chance. The shutter chance that is earlier than waiting the vibration settling prospective time WT falls between time t2 and time t3 or between time t5 and time t8 illustrated in FIG. 5. The earliest chance is time t2 which is indicated by a small circle at the head of the black band in the line of "4 Pn×Vn". The determination as to whether the position threshold value and the velocity threshold value have been reached is performed by the control portion 10, which issues an imaging instruction to release the shutter via the image processing portion 9.

As described above, the shutter is released when each of the position and the velocity of the hand becomes the threshold value or lower. Thus, wasted time can be reduced compared with the method of waiting the vibration settling prospective time WT.

In the description, it is idiomatically described that "shutter is released". However, because the camera is an electronic camera, the camera can take serial images with the use of an imaging element such as CCD and CMOS. Therefore, "shutter is released" implies "obtaining of images to be used for image processing" for searching the work.

<Embodiment 2>

Figure 3:
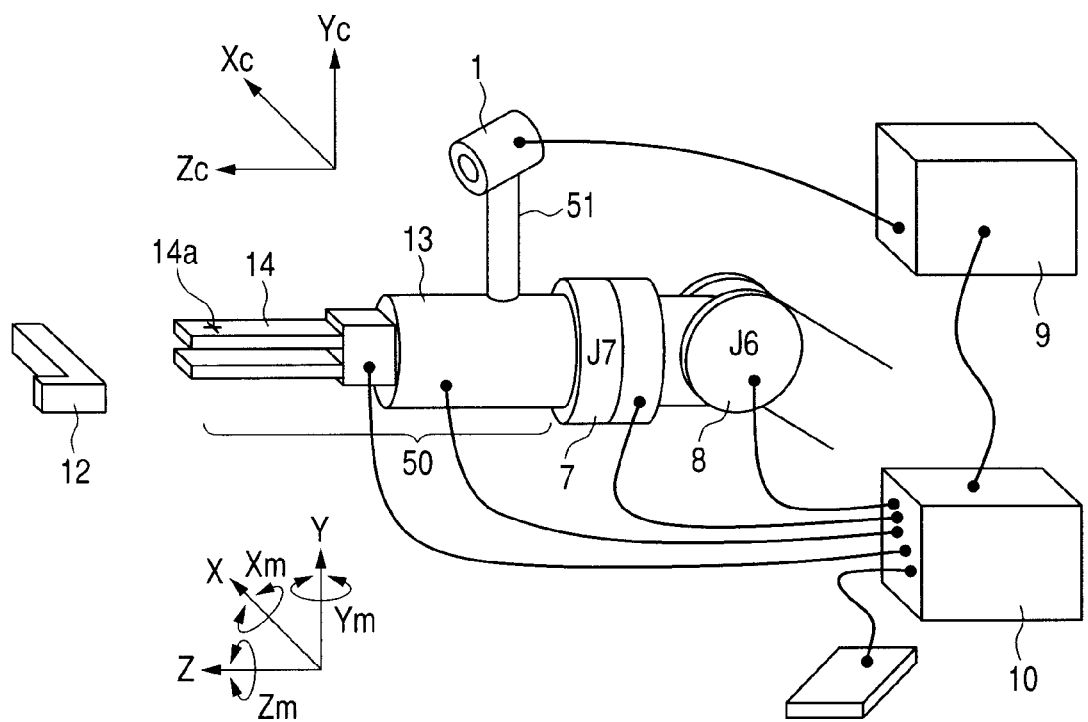
FIG. 3 is a perspective view illustrating a structure of a robot with a camera according to Embodiment 2.

Embodiment 2 is different from Embodiment 1 mainly in the following three physical structural elements as illustrated in FIG. 3.

1. Instead of the hand 6, a hand 50 with a 6-axis force sensor 13 is used, which has the same total length as the bracket 5.
2. The velocity sensor 3 is not used.
3. Instead of the finger 4, a finger 14 is used, which has an alignment mark 14a disposed on the same position as the point F.

The force sensor 13 detects forces applied to the finger 14 in six axis directions with orthogonal axis components (X, Y, Z) of the robot coordinates and moment axis components (Xm, Ym, Zm) thereof as a displacement of the finger 14, and the detection result is used for compliance control or the like in assembling. As an element for detecting force, a strain gauge is widely known. In this embodiment, a detection element using a magnet which detects a magnetic variation is used instead of the strain gauge.

The force sensor includes a magnet and an analog circuit such as an operational amplifier and therefore has an electric response characteristic of approximately a few kilohertz. Therefore, the force sensor can correctly detect a vibration with respect to an undershoot vibration frequency at approximately 10 Hz. Specifically, the finger 14 connected to the force sensor 13 is vibrated by inertia corresponding to the vibration so that the force sensor 13 responds to the vibration. The amplitude of the displacement is approximately ±100 μm, for example. A differential value of a displacement Xcf measured by the force sensor 13 can be detected as the real velocity Vn.

Figure 4:
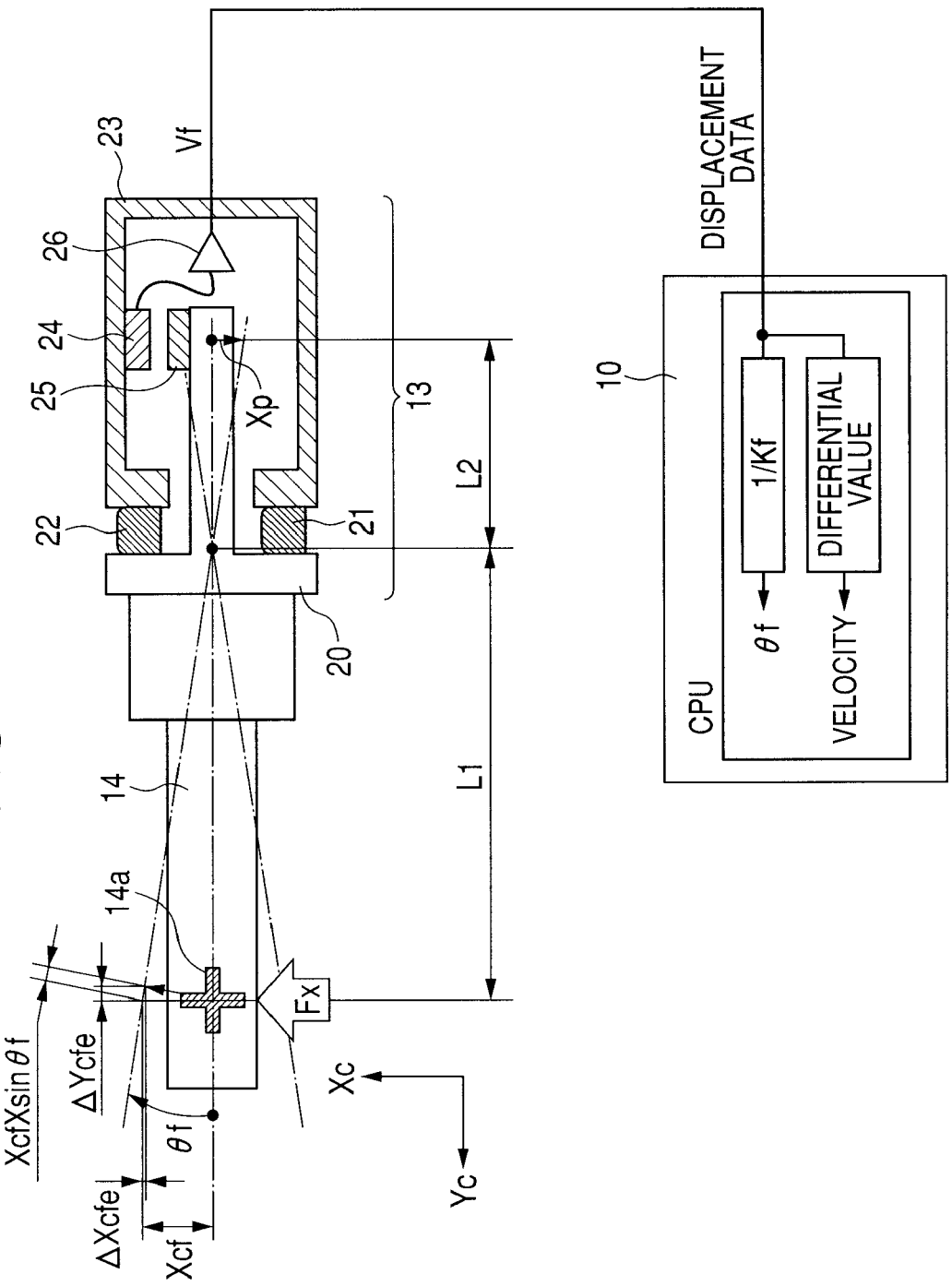
FIG. 4 is a schematic diagram illustrating a structure of a force sensor according to Embodiment 2.

FIG. 4 illustrates a structure of the force sensor 13 using a magnet. A housing 23 is coupled via elastic members 21 and 22 to an attachment portion 20 that is fixed to the finger 14. The housing 23 supports a magnet 24, and a magnet 25 fixed to the attachment portion 20 is opposed to the magnet 24. When a vibration causes inertia and applies a force Fx (that is supposed to exert at one point for description), a variation of magnetic field for varying a distance between the magnets 24 and 25 that are disposed at a distance L2 from a turning axis is amplified by an amplifier 26.

The elastic members 21 and 22 that mediate movement move linearly to the force Fx. A relationship between a turning angle θf when the force Fx is applied and an output Vf of the amplifier 26 is determined from Expression (3) that is a linear expression in which Kf represents a coefficient. The coefficient Kf is determined uniquely based on the elastic members 21 and 22, the amplifier 26, a distance L1 from the turning axis, and the like.

$$\theta f \times Kf = Vf \quad (3)$$

In addition, Expression (4) holds.

$$Xcf = L1 \times \tan \theta f \quad (4)$$

The alignment mark 14a on the finger 14 turns at the angle θf. Therefore, compared with the bracket type of Embodiment 1 having a rigid structure, a measured value in vibration includes errors ΔXcfe and ΔYcfe which are determined from Expressions (5) and (6), respectively. However, the displacements θf and Xcf can be calculated from the output of the amplifier 26. Therefore, a relative position between the alignment mark 14a and an imaging reference position 12a can be corrected.

$$\Delta Xcfe = (Xcf \times \sin \theta f) \times \cos \theta f \quad (5)$$

$$\Delta Ycfe = (Xcf \times \sin \theta f) \times \sin \theta f \quad (6)$$

The above-mentioned differential calculation and the calculations of Expressions (3) to (6) are performed by the control portion 10 that is capable of performing any processing, and a result of the calculation is shared with the image processing portion 9.

Therefore, the robot having the force sensor 13 detects the velocity of the hand with the force sensor 13. As a result, the velocity sensor 3 described in Embodiment 1 becomes unnecessary. Thus, wasted time can be reduced with a low cost and compact structure.

<Embodiment 3>

Embodiment 3 has a structure similar to that of the robot with a camera of Embodiment 1 illustrated in FIG. 1.

Figure 6:
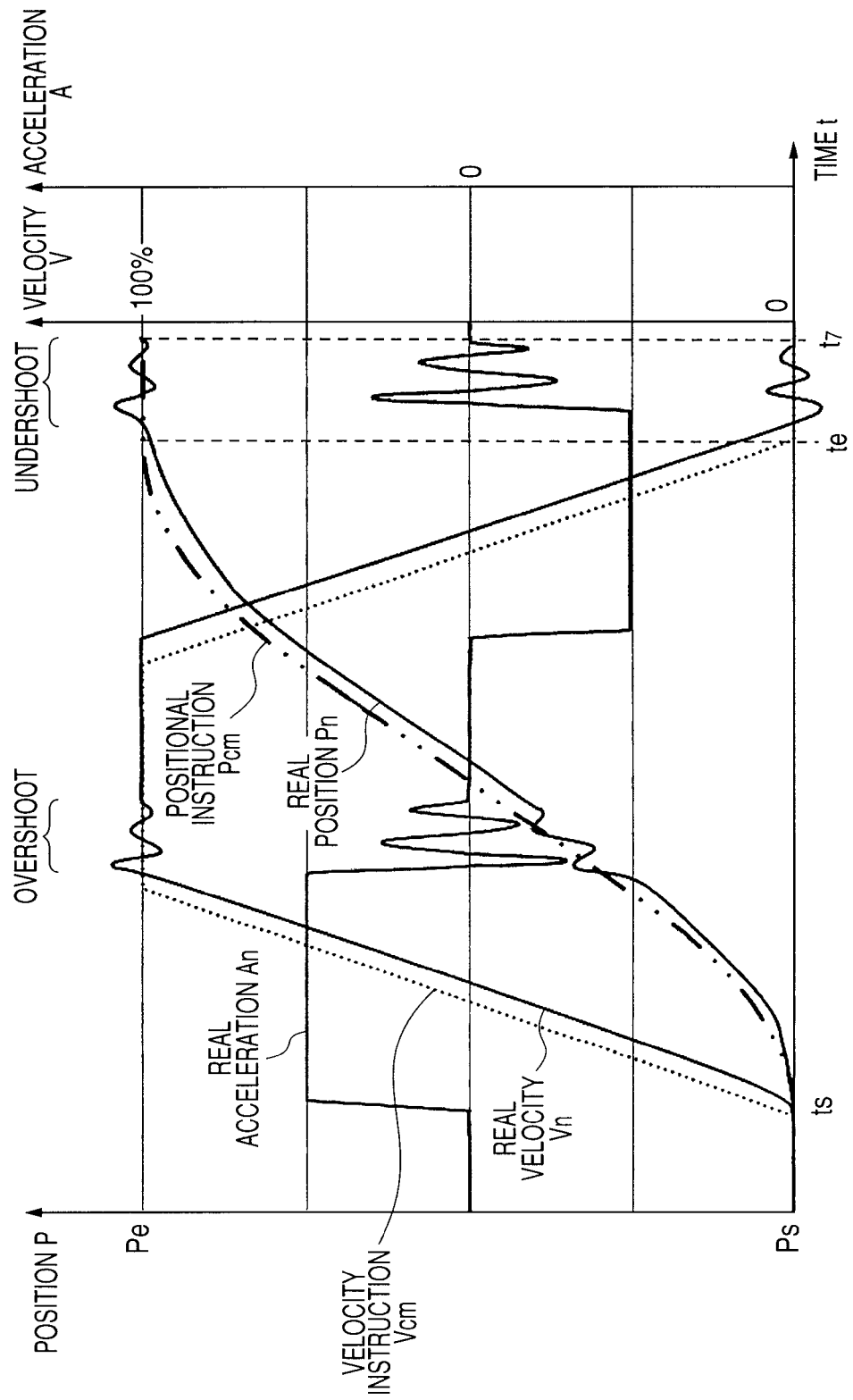
FIG. 6 is a graph illustrating variations of hand position, velocity, and acceleration when an arm is driven.
Figure 7A:
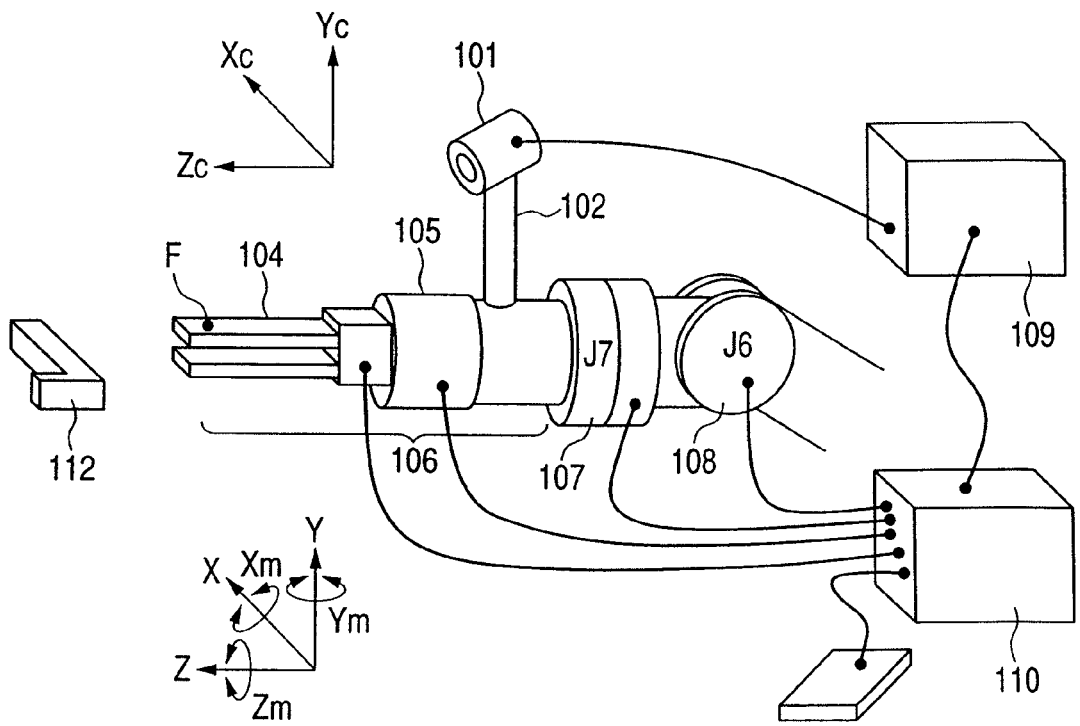
FIGS. 7A and 7B illustrate a robot with a camera according to a related technology.
Figure 7B:
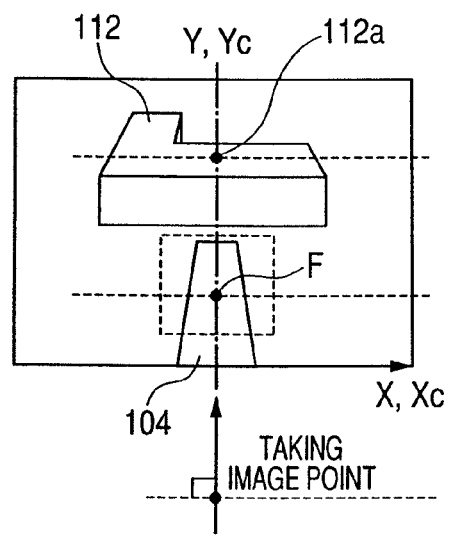

An acceleration of an object is a differential value of the velocity, and FIG. 6 and FIG. 5 illustrate loci with time of the real velocity Vn and the real acceleration An. For easy understanding of description, an amplitude of the real acceleration An is exaggerated in FIG. 6 and FIG. 5.

As described in Embodiment 1, the period after the time t5 is a shutter chance, and the real velocity Vn of the movement tends to be settled so that a blurred image is hardly generated. However, the real acceleration An is temporarily increased.

The product of the acceleration and a mass of the robot arm system works as a "force to press the robot arm system", and is responsible for vibration. Therefore, even if the velocity threshold values Δv1 and Δv2 are decreased when the shutter is released, the vibration may remain so as to deteriorate the measurement position accuracy of the subject.

An amplitude of vibration can be estimated by a "force pressing the robot arm system" and an elastic coefficient of the robot arm system. However, the elastic coefficient has a non-linear portion due to a posture or a structure of a speed reducer. Therefore, effort for parameter calculation or an error may occur.

Therefore, if the acceleration can be measured, it is an effective method to feedback the measured acceleration and to use the resultant for controlling the timing of releasing the shutter.

The acceleration corresponds to a differential value of the speed detection value of the velocity sensor 3 described in Embodiment 1 or to a differential value of the speed detection value of the force sensor 13 described in Embodiment 2.

Therefore, the acceleration can be obtained by the image processing portion 9 or 109, or the control portion 10 or 110.

Acceleration threshold values Δa1 and Δa2 are newly set in addition to the velocity threshold values Δv1 and Δv2 and the position threshold values Δp1 and Δp2 described above in Embodiment 1. The shutter is released after time t6 when being below all the three kinds of threshold values. Similarly to the determination as to whether the position threshold value and the velocity threshold value have been reached, the determination as to whether the acceleration threshold value has been reached is performed by the control portion 10, which issues the imaging instruction to release the shutter via the image processing portion 9.

In the upper part of FIG. 5, time slots below the acceleration threshold value are indicated by black bands in the line of "3 REAL ACCELERATION An". A time slot below all the three kinds of threshold values of the position, the velocity, and the acceleration is indicated by a black band in the line of "5 Pn×Vn×An". The earliest shutter chance is time t6 which is indicated by a small circle at the head of the black band. Therefore, a state with lower vibration can be realized though the timing is later than time t2 as a shutter chance in Embodiment 1.

Specific values Δa1 and Δa2 that are acceleration threshold values are set, for example, based on the guideline of the expression below, where A represents an allowable vibration amplitude.

$$\Delta a1 = A\omega^2(G) \tag{7}$$

where G=9.8 m/s^2.

For instance, if the allowable vibration amplitude is 0.1 mm, and the vibration frequency is 10 Hz, the set value of Δa1 is as follows.

$$\Delta a1 = 0.1 \text{ mm} \times (2\times\pi\times 10 \text{ Hz})^2 = 0.39 \, G$$

Therefore, the shutter timing is determined so as to satisfy all the threshold values of the acceleration, the position, and the velocity of the hand 6. Thus, wasted time can be reduced compared with the method of waiting the vibration settling prospective time WT. In addition, the shutter can be released in the state with lower vibration than in Embodiment 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-133764, filed Jun. 3, 2009, which is hereby incorporated by reference herein in its entirety.

What is claimed is:

1. A robot with a camera, comprising:
    a hand with a finger;
    a camera disposed on the hand;
    a robot arm including the hand;
    a control portion which searches for a work based on an image obtained by the camera and controls the robot arm;
    a unit which detects a velocity of the camera; and
    a unit which detects a position of the camera relative to a preset stopping position of the camera,
    with the control portion being configured to control the camera to take the image used for searching for the work, when the velocity of the camera is equal to or lower than a preset velocity threshold value and the position of the camera relative to the preset stopping position is equal to or lower than a preset position threshold value.

2. A robot with a camera according to claim 1, wherein the unit which detects the velocity is a velocity sensor mounted on the camera.

3. A robot with a camera according to claim 1, further comprising a force sensor which is disposed on the hand and measures a force applied to the finger, and
    the unit which detects the velocity and the unit which detects the position respectively is configured to detect the velocity and the position of the camera based on an output of the force sensor.

4. A robot with a camera according to claim 1, further comprising a unit which detects an acceleration of the camera, and
    the control portion is configured to control the camera to take the image used for searching for the work, when the acceleration of the camera is equal to or lower than a preset acceleration threshold value, the velocity of the camera is equal to or lower than the preset velocity threshold value, and the position of the camera is equal to or lower than the preset position threshold value.

* * * * *